(12) United States Patent
Foss, Jr. et al.

(10) Patent No.: US 8,626,642 B2
(45) Date of Patent: Jan. 7, 2014

(54) SYSTEM AND METHOD FOR DYNAMICALLY MANAGING A FINANCIAL ACCOUNT

(75) Inventors: Sheldon H. Foss, Jr., Suwanee, GA (US); Dennis H. James, Jr., Atlanta, GA (US)

(73) Assignee: Compucredit Intellectual Property Holdings Corp. III, Las Vegas, NV (US)

( * ) Notice: Subject to any disclaimer, the term of this patent is extended or adjusted under 35 U.S.C. 154(b) by 2519 days.

(21) Appl. No.: 10/646,150

(22) Filed: Aug. 22, 2003

(65) Prior Publication Data
US 2005/0044017 A1  Feb. 24, 2005

(51) Int. Cl.
*G06Q 40/00* (2012.01)

(52) U.S. Cl.
USPC ................. 705/38; 705/35; 705/36 R; 705/37

(58) Field of Classification Search
USPC .......................................................... 705/39
See application file for complete search history.

(56) References Cited

U.S. PATENT DOCUMENTS

| | | |
|---|---|---|
| 4,001,550 A | 1/1977 | Schatz |
| 4,104,515 A | 8/1978 | Thornburg et al. |
| 4,346,442 A | 8/1982 | Musmanne |
| 4,360,727 A | 11/1982 | Lehmann |
| 4,376,978 A | 3/1983 | Musmanne |
| 4,417,138 A | 11/1983 | Pfeiffer |
| 4,689,478 A | 8/1987 | Hale et al. |
| 4,694,397 A | 9/1987 | Grant et al. |
| 4,718,009 A | 1/1988 | Cuervo |
| 4,742,457 A | 5/1988 | Leon et al. |
| 4,755,940 A | 7/1988 | Brachtl et al. |
| 4,774,663 A | 9/1988 | Musmanno et al. |
| 4,877,947 A | 10/1989 | Mori |
| 4,877,950 A | 10/1989 | Halpern |
| 4,879,455 A | 11/1989 | Butterworth et al. |
| 5,010,485 A | 4/1991 | Bigari |
| 5,025,138 A | 6/1991 | Cuervo |
| 5,025,372 A | 6/1991 | Burton |
| 5,175,416 A | 12/1992 | Mansvelt et al. |
| 5,231,569 A | 7/1993 | Myatt et al. |
| 5,262,941 A | 11/1993 | Saladin et al. |
| 5,297,026 A | 3/1994 | Hoffman |
| 5,420,405 A | 5/1995 | Chasek |
| 5,428,684 A | 6/1995 | Akiyama et al. |
| 5,436,971 A | 7/1995 | Armbrust et al. |
| 5,444,616 A | 8/1995 | Nair et al. |
| 5,457,305 A | 10/1995 | Akel et al. |

(Continued)

OTHER PUBLICATIONS

Quittner, Jeremy. "Delinquency Up, Card Marketers Sharpen Focus Series: 1," American Banker, (Jul. 1996), vol. 161, Iss. 144, p. 1.*

*Primary Examiner* — Gregory Johnson
(74) *Attorney, Agent, or Firm* — Smith Risley Tempel Santos LLC

(57) ABSTRACT

The invention is directed towards dynamically managing a financial account based on risk modules, aggregated data, and individual behavior, wherein the risk modules are calculated using current and real-time data used in conjunction with prospective as well as current customer data. The risk of loss associated with operating financial accounts is reduced because the parameters under which the financial accounts operate is adjusted based on the aggregated data and the analysis provided from the risk models. This allows additional customers to be obtained but optimizes the risk of loss for the financial institution.

19 Claims, 2 Drawing Sheets

(56) References Cited

U.S. PATENT DOCUMENTS

| | | |
|---|---|---|
| 5,475,585 A | 12/1995 | Bush |
| 5,485,510 A | 1/1996 | Colbert |
| 5,504,677 A | 4/1996 | Pollin |
| 5,511,023 A | 4/1996 | Schrenk |
| 5,536,045 A | 7/1996 | Adams |
| 5,557,516 A | 9/1996 | Hogan |
| 5,559,887 A | 9/1996 | Davis et al. |
| 5,572,004 A | 11/1996 | Raimann |
| 5,577,121 A | 11/1996 | Davis et al. |
| 5,621,796 A | 4/1997 | Davis et al. |
| 5,637,845 A | 6/1997 | Kolls |
| 5,644,118 A | 7/1997 | Hayashida |
| 5,652,786 A | 7/1997 | Rogers |
| 5,689,100 A | 11/1997 | Carrithers |
| 5,692,132 A | 11/1997 | Hogan |
| 5,705,798 A | 1/1998 | Tarbox |
| 5,710,889 A | 1/1998 | Clark |
| 5,732,136 A | 3/1998 | Murphee |
| 5,770,843 A | 6/1998 | Rose |
| 5,811,771 A | 9/1998 | Dethloff |
| 5,815,657 A | 9/1998 | Willimas et al. |
| 5,834,757 A | 11/1998 | Fernandes et al. |
| 5,845,260 A | 12/1998 | Nakano |
| 5,864,830 A | 1/1999 | Armetta et al. |
| 5,870,456 A | 2/1999 | Rogers |
| 5,870,724 A | 2/1999 | Lawlor et al. |
| 5,884,289 A | 3/1999 | Anderson et al. |
| 5,890,140 A | 3/1999 | Clark |
| 5,914,472 A | 6/1999 | Foladare et al. |
| 5,924,084 A | 7/1999 | De Rooij |
| 5,936,221 A | 8/1999 | Corder et al. |
| 5,940,811 A | 8/1999 | Norris |
| 5,943,423 A | 8/1999 | Muftic |
| 5,952,639 A | 9/1999 | Ohki |
| 5,953,710 A | 9/1999 | Fleming |
| 5,955,961 A | 9/1999 | Wallerstein |
| 5,984,192 A | 11/1999 | Calcavara, Jr. et al. |
| 5,987,439 A | 11/1999 | Gustin et al. |
| 6,010,067 A | 1/2000 | Elbaum |
| 6,016,955 A | 1/2000 | De Rooij et al. |
| 6,045,050 A | 4/2000 | Ippolito et al. |
| 6,047,888 A | 4/2000 | Dethloff |
| 6,062,472 A | 5/2000 | Cheung |
| 6,065,675 A | 5/2000 | Teicher |
| 6,095,411 A | 8/2000 | Schrenk |
| 6,105,007 A | 8/2000 | Norris |
| 6,105,862 A | 8/2000 | Pailles et al. |
| 6,105,865 A | 8/2000 | Hardesty |
| 6,119,946 A | 9/2000 | Teicher |
| 6,126,069 A | 10/2000 | Stiefel et al. |
| 6,129,275 A | 10/2000 | Urquhart et al. |
| 6,138,907 A | 10/2000 | Mori et al. |
| 6,142,368 A | 11/2000 | Mullins et al. |
| 6,142,369 A | 11/2000 | Jonstromer |
| 6,152,365 A | 11/2000 | Kolls |
| 6,167,387 A | 12/2000 | Lee-Wai-Yin |
| 6,173,269 B1 | 1/2001 | Solokl et al. |
| 6,182,895 B1 | 2/2001 | Albrecht |
| 6,226,364 B1 * | 5/2001 | O'Neil ........................ 379/114.2 |
| 6,243,688 B1 | 6/2001 | Kalina |
| 6,279,824 B1 | 8/2001 | Park |
| 6,293,462 B1 | 9/2001 | Gangi |
| 6,295,522 B1 | 9/2001 | Boesch |
| 6,325,292 B1 | 12/2001 | Sehr |
| 6,327,578 B1 | 12/2001 | Linehan |
| 6,354,490 B1 | 3/2002 | Weiss |
| 6,394,343 B1 | 5/2002 | Berg et al. |
| 6,405,181 B2 * | 6/2002 | Lent et al. ........................ 705/38 |
| 6,422,462 B1 | 7/2002 | Cohen |
| 6,439,456 B1 | 8/2002 | Bansal et al. |
| 6,450,407 B1 | 9/2002 | Freeman et al. |
| 6,488,206 B1 | 12/2002 | Flaig et al. |
| 6,505,171 B1 | 1/2003 | Cohen et al. |
| 6,505,772 B1 | 1/2003 | Mollett et al. |
| 6,507,644 B1 | 1/2003 | Henderson et al. |
| 6,527,192 B1 | 3/2003 | Altschul et al. |
| 6,560,581 B1 | 5/2003 | Fox |
| 6,578,761 B1 | 6/2003 | Spector |
| 6,587,841 B1 | 7/2003 | DeFrancesco |
| 6,601,771 B2 | 8/2003 | Charrin |
| 2001/0007332 A1 | 7/2001 | Kjonaas et al. |
| 2001/0011249 A1 | 8/2001 | Yanagihara et al. |
| 2001/0013018 A1 | 8/2001 | Awano |
| 2001/0013545 A1 | 8/2001 | Hogan |
| 2001/0029489 A1 | 10/2001 | Brookner et al. |
| 2001/0032878 A1 | 10/2001 | Tsiounis et al. |
| 2001/0034684 A1 * | 10/2001 | Cushing et al. ........................ 705/35 |
| 2001/0034722 A1 | 10/2001 | Tidball et al. |
| 2001/0037299 A1 | 11/2001 | Nichols et al. |
| 2001/0042784 A1 | 11/2001 | Fite et al. |
| 2001/0045454 A1 | 11/2001 | Gangi |
| 2002/0002533 A1 | 1/2002 | Singhal |
| 2002/0002534 A1 | 1/2002 | Davis et al. |
| 2002/0020738 A1 | 2/2002 | Campbell et al. |
| 2002/0033417 A1 | 3/2002 | Jeon |
| 2002/0040925 A1 | 4/2002 | Weber |
| 2002/0083012 A1 | 6/2002 | Bush et al. |
| 2002/0088849 A1 | 7/2002 | Nichols et al. |
| 2002/0117541 A1 | 8/2002 | Biggar et al. |
| 2002/0125310 A1 | 9/2002 | Kursawe |
| 2002/0138447 A1 | 9/2002 | Dutta |
| 2002/0139837 A1 * | 10/2002 | Spitz et al. ........................ 235/375 |
| 2002/0143647 A1 | 10/2002 | Headings et al. |
| 2002/0161705 A1 | 10/2002 | Khan et al. |
| 2002/0188533 A1 * | 12/2002 | Sanchez et al. ........................ 705/30 |
| 2002/0198825 A1 | 12/2002 | Jentoft |
| 2003/0019924 A1 | 1/2003 | Mullins et al. |
| 2003/0075610 A1 | 4/2003 | Ong |
| 2003/0121969 A1 | 7/2003 | Wankmueller |
| 2003/0187778 A1 * | 10/2003 | Sgaraglio et al. ........................ 705/38 |
| 2003/0212796 A1 | 11/2003 | Willard et al. |
| 2004/0030647 A1 | 2/2004 | Hansen et al. |
| 2004/0054587 A1 | 3/2004 | Dev et al. |
| 2004/0078325 A1 * | 4/2004 | O'Connor ........................ 705/39 |
| 2004/0167821 A1 | 8/2004 | Baumgartner |
| 2004/0199422 A1 | 10/2004 | Napier et al. |
| 2005/0010483 A1 | 1/2005 | Ling |
| 2005/0038714 A1 | 2/2005 | Bonet et al. |
| 2005/0065877 A1 | 3/2005 | Cleary et al. |
| 2005/0182720 A1 | 8/2005 | Willard et al. |

* cited by examiner

SYSTEM AND METHOD FOR DYNAMICALLY MANAGING A FINANCIAL ACCOUNT

CROSS REFERENCE TO RELATED APPLICATIONS

This application is related to, and incorporates by reference, U.S. patent application having Ser. No. 10/645,949, filed Aug. 22, 2003,and entitled "SYSTEM FOR PROVIDING A CHECKLESS CHECKING ACCOUNT" which is filed concurrently herewith and is assigned to the same assignee.

This application claims priority to U.S. Provisional Application for Patent having Ser. No. 60/466,494 filed on Apr. 29, 2003.

TECHNICAL FIELD

The present invention relates to banking industries and, more particularly, to a system and method for dynamically managing a financial account by observing transaction for a plurality of financial accounts, aggregating the information regarding the transactions and modifying the services provided to the financial account based on the aggregated information.

BACKGROUND OF THE INVENTION

In the financial management industry, an increase in profit is typically realized when there is an increase in volume of credit contracts, a reduction in the loss from active credit contracts, or a combination of both. The major source of loss is typically due to customers defaulting in their payments. To reduce incidences of default in payments, it is important to carefully screen credit applications. Screening credit applications with stringent criteria can lead to significant reduction in losses due to defaults in payments. Such screening can help to identify when economic hardships are foreseeable from the applicant's financial status. However, stringent approval criteria may also result in a decline in the number of approvals of credit applications. Therefore, it is desirable to reduce the risk of loss without a significant impact on the growth in the volume of credit contracts. It is also desirable to increase the volume of credit contracts by controlling the criteria used to approve credit applications, without incurring a significant increase in the risk or loss or in actual loss.

Known techniques in controlling the criteria used to approve credit applications generally are based on the use of current spending data. However, in such techniques, the criteria are used to predict future economic conditions and spending based on data at a given point in time.

What is needed, therefore, is a credit management system that is more adaptable to real-time changes in the economy and spending habits.

SUMMARY OF THE INVENTION

The present invention meets these needs in the art by dynamically managing a financial account. The financial account is created based on a set of underwriting criteria and is established with a laundry list of services and parameters under which those services are provided. Based on aggregated data accumulated from the transaction activity of several financial accounts being serviced, the services and parameters of a financial account can be modified, augmented or discontinued on a real-time or virtually real-time basis.

In addition, the present invention can operate to modify the underwriting criteria that serve as the basis for qualifying a customer for an account based on the aggregated data and/or input from various risk models. Likewise, the services and parameters of the financial account can be modified based on the underwriting criteria.

In one embodiment, risk models are used to further define or modify the underwriting criteria. The risk models can operate on the aggregated data or on other industry information.

The modifications to the services and parameters of the financial account include, but are not limited to, (a) modifying the fees associated with services, (b) modifying a line of credit associated with the account, (c) modifying restrictions on transactions, and/or (d) temporarily disabling the account or particular services associated with the financial account.

BRIEF DESCRIPTION OF THE DRAWINGS

Other aspects, advantages and novel features of the invention will become more apparent from the following detailed description of exemplary embodiments of the invention when considered in conjunction with the accompanying drawings wherein.

DETAILED DESCRIPTION

In general, the present invention can be described as a novel system and method for dynamically managing a financial account based on the use of risk modules, aggregated data, and behavior of the customer or class of customers. The exemplary embodiments provided within this description are for illustrative purposes only and a person skilled in the art should construe them broadly. Referring now to the figures, in which like numerals refer to like elements throughout the several views, exemplary embodiments of the present invention are described. Throughout the detailed description, reference will be made to the operation of the present invention in utilizing the Stored Value Systems that are currently deployed by several credit card processing companies. These systems operate to create accounts for the issuance of a card, and provide the settlement and authorization functionalities. It should be understood that the features and aspects of the present invention can be ported into a variety of systems and system/network configurations and any examples provided within this description are for illustrative purposes only.

Figure 1:
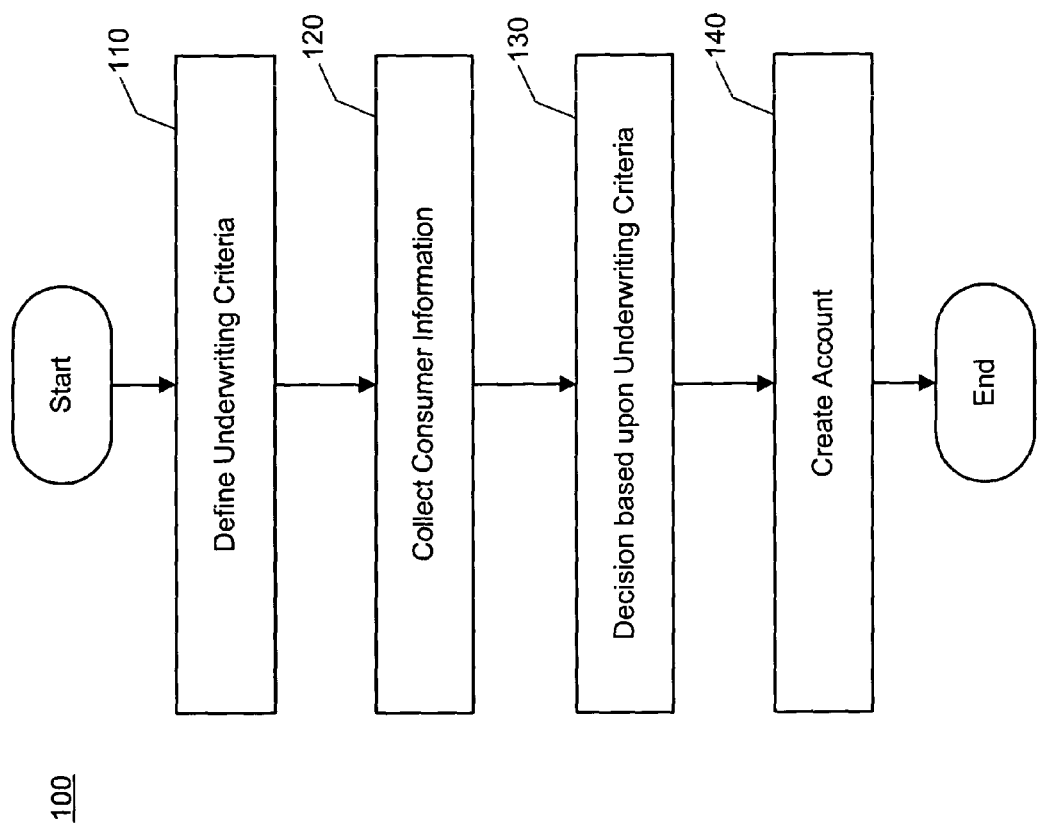
FIG. 1 is a flow diagram that illustrates a traditional process used in the management of a credit account.

FIG. 1 is a flow diagram that illustrates a traditional process used in the management of a financial account. Although the details of the operation of the transaction 100 may vary among various embodiments of the present invention, an exemplary embodiment includes the steps of: (a) defining the underwriting criteria; (b) collecting consumer information; (c) making a decision based on the underwriting criteria; and (d) creating the account. More specifically, the process 100 includes the step of defining the underwriting criteria 110. In this step, the credit issuer defines a set of criteria used to determine the credit worthiness of an individual and uses risk management techniques to determine if an individual will qualify for an account. The exact criteria used in this step may differ from issuer to issuer and one skilled in the art would know many different sets of suitable criteria. At the very least, the underwriting criteria is determined at the beginning of the process and used as a benchmark of qualification for an account. Typically, the underwriting criteria remains constant throughout the process and is used only for the initial qualification.

The next step in process 100 involves the step of collecting consumer information 120 that is used to qualify the consumer. Some examples of consumer information include, but are not limited to the name, date of birth, address, telephone, social security number, verified government identification, direct deposit account (DDA) information and number, savings account information and number, credit history, debt to credit ratio, assets, marital status, employment history etc., of the consumer.

Next, a decision is made based upon the underwriting criteria 130. The details of this step may vary between issuers and may be considered proprietary; however, one skilled in the art would construe this step to be known in the art. If the decision based upon the underwriting criteria 130 is that the consumer qualifies for an account, the next step is creating the account 140. This is where the account is set up and ready to be managed. After the step of creating the account 140 is completed, the issuer sends the consumer the appropriate information to use the account and routine maintenance of the account continues from there.

Figure 2:
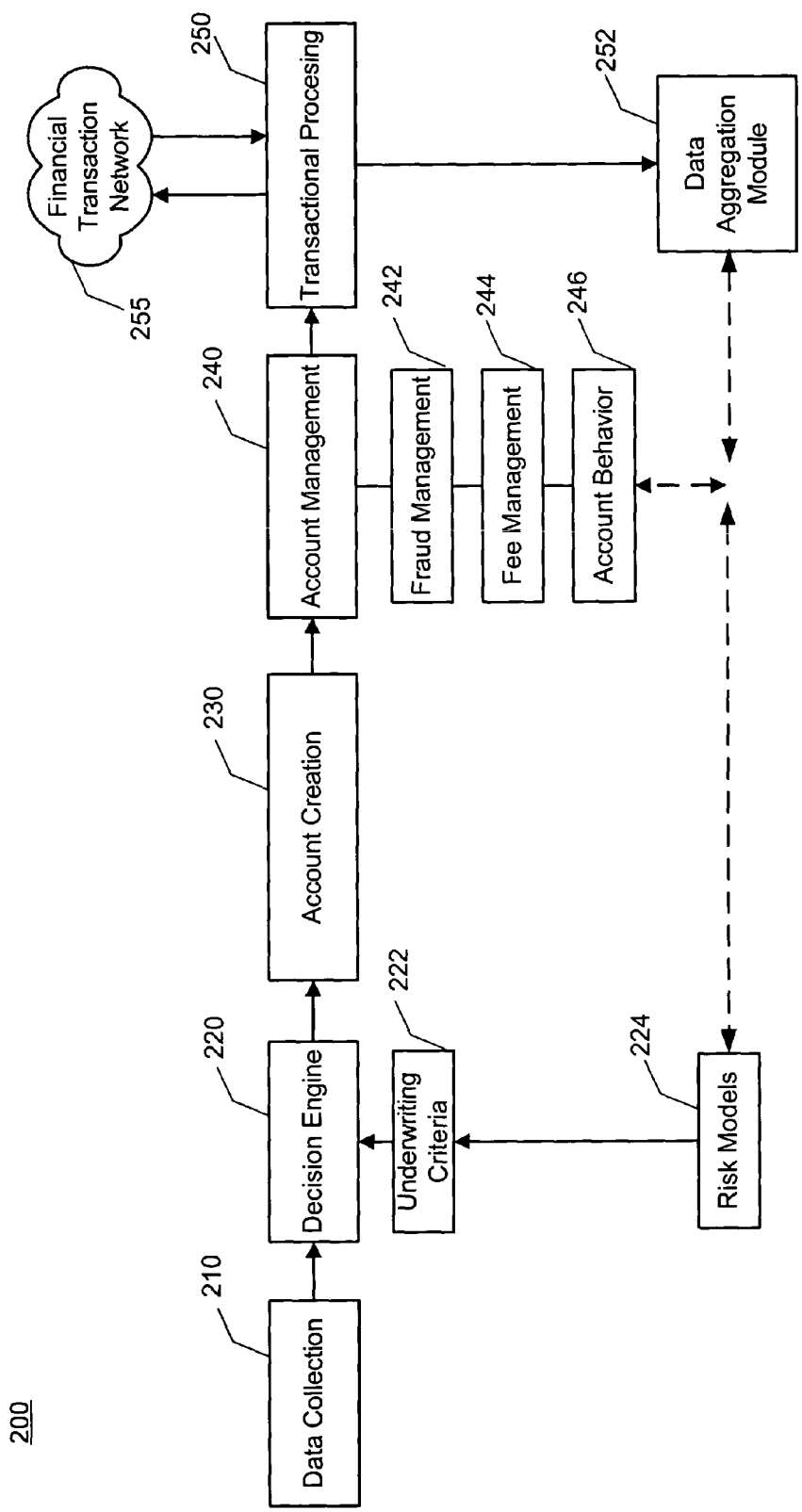
FIG. 2 is a system diagram illustrating an exemplary application of the present invention.

FIG. 2 is a flow diagram illustrating an exemplary embodiment of the present invention. The details of the operation of the flow diagram 200 may vary among various embodiments of the present invention. In general, the illustrated embodiment includes five main functions or components: the data collection component 210, the decision engine 220, the account creation component 230, the account management component 240 and the transactional processing component 250. It should be understood that the structure illustrated in this figure is for discussion purposes only and the various functions or components of the present system could be combined or split in many manners.

The data collection component 210 collects data or information relevant to: opening a credit account (account formation data 212), determining if an applicant can qualify for an account, the type of account to be opened (account option data 214), and other miscellaneous data. The information collected with regards to the account formation data 212 may include, but is not limited to, the applicant's name, date of birth, mailing, residential and business addresses, telephone numbers, social security number or verified government identification number, direct deposit account (DDA) information and account number, savings account information and account number, credit history, debt to credit ratio, assets, marital status, employment history etc.

Further information regarding the account formation data 212, the account option data 214 and the account types can be found in the related application that has been incorporated into this specification by reference. After the data collection component 210 receives the necessary or the minimum amount of information, the decision engine 220 can be begin processing.

The decision engine 220 receives raw or processed data from the data collection component 210 and, among other functions, integrates it with underwriting criteria 222 to determine if a customer qualifies for an account. The underwriting criteria 222 is initially determined using a collection of integrated algorithms, methods of work, business processes, and initial risk modules 224 that enable the analysis, issuance, distribution, and monitoring of an integrated credit product. The initial risk models 224 are compiled from a variety of different sources that vary by issuer and one skilled in the art is familiar with the type of information that is associated with them. In addition to determining if a customer qualifies for an account, the decision engine system 220 also determines if a customer qualifies for any applicable account option data 214 selected in the data collection system 210. For example, if a customer selected an overdraft option in the account option data 214, the decision engine 220 would determine if the customer qualified for that option and, if qualified, the amount of the overdraft limit. The decision engine 220 uses the account formation data 212 to qualify the customer and perform a risk management processes. The customer is subjected to underwriting criteria 222 to determine qualification and some additional data or documents may be required for the process.

Once a customer is qualified, the account creation component 230 proceeds to open an account. The account creation component 230 may perform different functions depending upon the account option data 214. Preferably, the account creation component 230 operates to create an account for the customer in a manner that is in compliance with all applicable local, state and federal laws. During the account creation, the account creation component 230 may utilize various procedures to support issuer risk mitigation requirements. In an exemplary embodiment, the risk mitigation procedures are only instituted for an account with the overdraft component 234 and not the other account types. Those skilled in the art will be aware of the various mitigation procedures and understand that the procedures can vary by each issuer and are commonly known in the art.

The procedures performed by the account creation component 230 may vary depending on the type of account being created. In the examples provided in the incorporated reference, the three account types include the instant issue card, the basic card and the basic card with overdraft protection. Other functions that may be performed by the account creation component 230 include the activation of the account the issuance of cards. The details of these functions are more specifically described in the incorporated reference.

The account management component 240 manages the customer account by utilizing controllers to enable and disable certain functions and privileges of the account based on various factors. Some of the factors can include account risks and customer behaviors. In one embodiment, the account management component 240 can include the functions of fraud management model 242, fee management model 244 and account behavior model 246. The fraud management model 242 can utilize the operation of the account behavior model 246 to determine if any fraudulent activities are associated with the account. If any fraudulent activities are detected, the account management component 240 can be notified by the fraud management model 242 to suspend the account. The fee management model 244 determines and assesses any applicable fees to be charged against the account. For example, if the account is overdue, a late fee would be assessed to the account. In the various embodiments, additional fees can be assessed against the accounts. For instance, a one time fee may be assessed for the creation of the account or for the creation of certain accounts, such as accounts having an overdraft component 234. In addition, the account may include a fixed number of transactions or a fixed number of transactions per fixed period (i.e. per month). Once the fixed number of transactions is exceeded, additional transactions can be assessed a transaction fee. In another embodiment, a monthly fee may be assessed on the account.

The account behavior model 246 examines account activity and looks for patterns in the account activity to determine possible actions to be taken (i.e. intervention to stop fraud). For example, if an account appeared to have sporadic spending or if the stored value became zero, the account could be turned off temporarily to ascertain if the account is being defrauded. The transactional processing component 250 processes and monitors the day to day transactions between the account and the financial transaction network 255. The transactional processing component 250 is then compiled by the data aggregation module 252.

The data aggregation module 252 may work on data related to the entire population of account holders, groups of populations based on factors such as age, occupation, areas of domicile etc. or even individuals. The data aggregation module 252 provides processed outputs to the risk models 224 and the account behavior 246 model.

A key aspect of the present invention is found in the operation of the account management component 240. The account management component 240 of the present invention enables the dynamic management and alteration of the financial account based on real-time and current information. Two controlling factors are applied to the account management component 240. These controlling factors include the output of risk models 242 that have been run on the initial underwriting criteria collected by the data collection component 210, as well as the output of the data aggregation module 252.

The data aggregation module 252 refines and updates, preferably on a real-time basis, the various current trends of the accounts being managed. This information is then fed into the risk models 224 which determine new underwriting criteria 222, and the account behavior 246 model. The data aggregation module 252 can feed information into the risk models 224 and the account behavior 246 model at periodic intervals, continuously, autonomously, on request, or on other bases. The account behavior model 246 can operate to alter the parameters of the operation of the credit account. The account behavior model 246 can base these alterations on the input from the aggregation module 252 and/or the risk models 224. Thus, in operation, the data aggregation module 252 may identify trends for a particular subset of the population. This information in turn can be used by the risk models 224 to identify certain risks associated with the particular subset or related subsets of the population. This information, as well as the information directly provided from the data aggregation module 252 can serve as the basis for altering the parameters of the credit account. As a particular example, suppose that the data aggregation module 252 identifies an increase in transactions by customers identified as working in the airline sector and the risk models 224 indicate a decline in job stability in the transportation industry. The account behavior model 246 may utilize this information to decrease the lines of credit provided to customers working in the airline sector, increase fees associated with their accounts, provide a higher level of scrutiny on approvals of purchases, lock the account from further purchases, or the like. From a fraud perspective, the account behavior model can receive information from the data aggregation module 252 that may be an indication of fraudulent behavior. The account behavior module 246 can then take actions to limit or alleviate the risk of fraud.

Similarly, the risk models 224 can receive input from the data aggregation module 252 and/or the account behavior model 246. The information fed to the risk models 224 is used as the basis for generating new underwriting criteria for qualifying new individuals for accounts. The new underwriting criterion provides more accurate real-time criteria that are not otherwise available when using underwriting criteria that has only been created at the initial stages of qualification.

Thus, the present invention operates to set forth the criteria for a customer to qualify for a financial account and to further augment that criteria based on the activities of the customer, the activities of other customers and the output of risk models.

This functionality advantageously allows the application of filters in the qualification process based on real-time, real-world information. In addition, the active accounts can be closely managed and controlled based on the activities of the customer or a class of customers, as well as the output of risk models. Thus, the risk of loss associated with the active accounts can be controlled based on real-time real-world information without further restricting the number of financial accounts that are awarded to customers. One skilled in the art will appreciate that the application of the present invention can take many forms and functions and the examples provided herein are only used to illustrate a few of these possibilities. The scope of the present invention is not limited by these examples.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although this disclosure describes the invention in terms of exemplary embodiments, the invention is not limited to those embodiments. Rather, a person skilled in the art will construe the appended claims broadly, to include other variants and embodiments of the invention, which those skilled in the art may make or use without departing from the scope and range of equivalents of the invention.

What is claimed is:

1. A computer system for managing financial accounts, the computer system comprising:
    a processing system configured to execute a plurality of integrated computer software components configured to establish a new financial account for a new customer and manage a plurality of existing financial accounts for a plurality of existing customers, the integrated computer software components comprising:
        a data collection component configured to receive account option data and account formation data pertaining to a new customer;
        a decision engine configured to qualify the new customer for a new financial account based at least in part on qualification criteria and said formation data and said account option data;
        an account creation component configured to establish the new financial account for the qualified customer based at least in part on the account option data and account formation data;
        an account management component configured to manage account data associated with said new financial account and a plurality of existing financial accounts;
        a transactional processing component configured to receive transactions and clear the transactions against the new financial account and the plurality of existing financial accounts; and
        a data aggregation module coupled with the account management component, the transactional processing component, and the decision engine, the data aggregation module configured to aggregate data associated with the transactions for the plurality of existing financial accounts and provide feedback information related to the aggregated transaction data to the decision engine and the account management component, wherein the decision engine modifies the qualification criteria based on the feedback information and the account management component modifies the account data of one or more of the new financial account and the existing financial accounts based on the feedback information.

2. The computer system of claim 1, wherein said decision engine further comprises an underwriting component configured to apply the qualification criteria.

3. The computer system of claim 2, wherein said decision engine further comprises at least one risk model coupled to said underwriting component and said account management component, the at least one risk model configured to model risks associated with said new financial account and the existing financial accounts.

4. The computer system of claim 1, wherein said account management component further comprises an account behavior component configured to examine account behavior associated with the new financial account and the plurality of existing financial accounts.

5. The computer system of claim 4, wherein said account behavior component further comprises a controller configured to enable and disable functions and privileges of said new financial account or the existing financial accounts based upon said aggregated data.

6. The computer system of claim 1, wherein said decision engine comprises an underwriting component configured to apply the qualification criteria and at least one risk model coupled to said underwriting component and said account management component and associated with said qualification criteria configured to model risks associated with said new financial account or the existing financial accounts.

7. The computer system of claim 6, wherein said at least one risk model is coupled to said data aggregation module and said account behavior component, wherein said at least one risk model is configured to update risk models based upon said aggregated data and said account behavior, whereby said qualification criteria is updated.

8. The computer system of claim 7, wherein said account management component comprises an account behavior component configured to alter a parameter related to operation of the new or existing financial accounts based upon said risk models.

9. A method for managing financial accounts, comprising the steps of:
a processing system aggregating transaction data regarding a plurality of existing financial accounts for a plurality of existing customers, the transaction data received by a processing system via a financial transaction network;
the processing system modifying services provided to one of the existing customers associated with at least one of the existing financial accounts, via the financial transaction network, based on the aggregated transaction data from the plurality of existing financial accounts by changing account data associated with the corresponding financial account; and
the processing system modifying stored underwriting criteria applied by the processing system for qualifying new financial accounts based on the aggregated transaction data from the plurality of existing financial accounts.

10. The method of claim 9, further comprising the steps of:
the processing system accessing a risk model;
the processing system running the risk model based at least in part on the aggregated transaction data;
the processing system modifying the stored underwriting criteria based at least in part on the results of the risk model.

11. The method of claim 9, wherein the step of the processing system modifying the services comprises the step of the processing system modifying the stored underwriting criteria.

12. The method of claim 9, wherein the step of the processing system modifying the services comprises the step of the processing system modifying the fees associated with services.

13. The method of claim 9, wherein the step of the processing system aggregating transaction data comprises the step of the processing system receiving transaction information regarding financial transactions associated with at least one of the existing financial accounts.

14. The method of claim 9, wherein the step of the processing system modifying the services comprises the step of the processing system modifying a line of credit associated with at least one of the existing financial accounts.

15. The method of claim 9, wherein the step of the processing system modifying the services comprises the step of the processing system modifying restrictions on transactions for at least one of the existing financial accounts.

16. The method of claim 9, wherein the step of the processing system modifying the services comprises the step of the processing system temporarily disabling one or more services associated with at least one of the existing financial accounts.

17. A computer system for managing financial accounts, the system comprising:
a processing system configured to execute a plurality of integrated computer software components
for underwriting and establishing a new financial account for a new customer and managing a plurality of existing financial accounts for a plurality of existing customers, the integrated computer software components comprising:
an account management component configured to manage account data associated with a plurality of existing financial accounts;
a transactional processing component configured to process and monitor transactions between the plurality of existing financial accounts and a financial transaction network;
a data collection component configured to receive account information for a new financial account;
a decision engine configured to qualify the new financial account based on underwriting criteria and the account information;
an account creation component configured to establish the qualified account based on the account information; and
a data aggregation module in communication with the transactional processing component, the account management component, and the decision engine, the data aggregation module configured to process transaction data from the plurality of existing customers received from the transactional processing component and provide feedback information related to the processed transaction data to the account management component and the decision engine for altering the underwriting criteria for qualifying further new financial accounts and altering the account data associated with at least one of the existing financial accounts.

18. The computer system of claim 17, wherein the decision engine is configured to alter the underwriting criteria based on the feedback information and the account management component is configured to alter parameters of the existing financial accounts based on the feedback information.

19. The computer system of claim 18, wherein the decision engine interfaces with a risk model which is updated based on the feedback information from the data aggregation module.

* * * * *